(12) United States Patent
Chiueh et al.

(10) Patent No.: US 9,231,831 B2
(45) Date of Patent: Jan. 5, 2016

(54) METHOD AND NETWORK SYSTEM OF CONVERTING A LAYER TWO NETWORK FROM A SPANNING TREE PROTOCOL MODE TO A ROUTED MESH MODE WITHOUT A SPANNING TREE PROTOCOL

(71) Applicant: Industrial Technology Research Institute, Hsinchu (TW)

(72) Inventors: Tzi-Cker Chiueh, Taipei (TW); Cheng-Chun Tu, Hsinchu (TW); Pai-Wei Wang, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 456 days.

(21) Appl. No.: 13/677,312

(22) Filed: Nov. 15, 2012

(65) Prior Publication Data

US 2014/0133360 A1     May 15, 2014

(51) Int. Cl.
   H04L 12/24    (2006.01)
   H04L 12/753   (2013.01)
   H04L 12/705   (2013.01)

(52) U.S. Cl.
   CPC .............. H04L 41/12 (2013.01); H04L 45/48 (2013.01); H04L 45/18 (2013.01); Y02B 60/43 (2013.01)

(58) Field of Classification Search
   None
   See application file for complete search history.

(56) References Cited

U.S. PATENT DOCUMENTS

| | | | |
|---|---|---|---|
| 5,881,246 A * | 3/1999 | Crawley et al. | 709/238 |
| 6,556,541 B1 * | 4/2003 | Bare | 370/235 |
| 6,580,715 B1 | 6/2003 | Bare | |
| 6,865,160 B1 | 3/2005 | Bare | |
| 7,756,035 B2 | 7/2010 | Bragg et al. | |
| 8,089,866 B2 | 1/2012 | Smith et al. | |
| 8,250,654 B1 * | 8/2012 | Kennedy et al. | 726/22 |
| 2006/0129518 A1 * | 6/2006 | Andreev et al. | 707/1 |
| 2008/0219268 A1 * | 9/2008 | Dennison | 370/395.2 |
| 2009/0022069 A1 | 1/2009 | Khan et al. | |
| 2009/0122732 A1 * | 5/2009 | Brockners et al. | 370/296 |

(Continued)

FOREIGN PATENT DOCUMENTS

| | | |
|---|---|---|
| TW | I238624 | 8/2005 |
| TW | 201242314 | 10/2012 |

OTHER PUBLICATIONS

Touch et al., "Transparent Interconnection of Lots of Links (TRILL): Problem and Applicability Statement," May 2009, Retrieved from http://tools.ietf.org/html/rFc5556.

(Continued)

*Primary Examiner* — Noel Beharry
*Assistant Examiner* — Rodrick Mak
(74) *Attorney, Agent, or Firm* — Jianq Chyun IP Office

(57) ABSTRACT

A method of converting a routing mode of a network is provided, wherein a plurality of first routes connected a central controller to a plurality of nodes are established in the network through a spanning tree protocol and a plurality of second routes between the nodes in the network through the spanning tree protocol. The method includes enabling a firewall of each of the nodes to block the second routes; disabling a spanning tree protocol function of each of the nodes; populating a forwarding table of each of the nodes with a plurality of predetermined routing paths; and flushing the firewall of each of the nodes, wherein a plurality of third routes between the central controller and the plurality of nodes are established according to the predetermined routing paths without the spanning tree protocol, after the firewall of each of the nodes is flushed.

25 Claims, 8 Drawing Sheets

(56) References Cited

U.S. PATENT DOCUMENTS

2011/0044346 A1* 2/2011 Mueller et al. .............. 370/401
2012/0113871 A1   5/2012 Bulusu
2013/0077621 A1* 3/2013 Jacob Da Silva et al. .... 370/355

OTHER PUBLICATIONS

McKeown et al., "OpenFlow: Enabling Innovation in Campus Networks," ACM SIGCOMM Computer Communication Review 38(2), Apr. 2008, pp. 69-74.

Mysore et al., "Portland: A Scalable Fault-Tolerant Layer 2. Data Center Network Fabric," Proceedings of ACM SIGCOMM 2009, Aug. 2009, pp. 39-50.

Kim et al., "Floodless in Seattle: A Scalable Ethernet Architecture for Large Enterprises," Proceedings ACM SIGCOMM 2008, Aug. 2008, pp. 1-14.

Al-Fares et al., "Hedera: Dynamic Flow Scheduling for Data Center Networks," Proceedings of the 7th USENIX Symposium on Networked Systems Design and Implementation (NSDI '10), Apr. 2010, pp. 1-15.

"Office Action of Taiwan Counterpart Application", issued on Jan. 8, 2015, p. 1-p. 6.

* cited by examiner

METHOD AND NETWORK SYSTEM OF CONVERTING A LAYER TWO NETWORK FROM A SPANNING TREE PROTOCOL MODE TO A ROUTED MESH MODE WITHOUT A SPANNING TREE PROTOCOL

TECHNICAL FIELD

The technical field relates to a method of converting a routing mode of a network, and a central controller and a data center network system using the method.

BACKGROUND

In a layer two (L2) network, the spanning tree protocol (STP) is applied to avoid the loops that result in broadcast storm and break down the entire layer two network. The STP prevents the loops by detecting the redundant links that could form loops and blocking these links in the layer two network. The STP is an IEEE standard, 802.1D, and has been implemented in all the layer two switches.

The waste of the bandwidth of the blocked links is a drawback of the STP. In the highly mesh or fabric network topology, which is more and more popular in the data center network, there exist a lot of redundant links and therefore STP causes a huge amount of waste of the bandwidth. The Multiple Spanning Tree Protocol (MSTP) allows a separate spanning tree for each VLAN group. The MSTP could improve the bandwidth utilization rate if there are a lot of VLAN groups and each of them selects different alternative path. However, the MSTP requires more complex configuration than the STP and the bandwidth utilization could still be poor if there is only a few number of VLAN groups or the STP instances of these VLAN groups select common paths among all the possible alternatives.

SUMMARY

One of exemplary embodiments comprises a method of converting a routing mode of a network, wherein a plurality of first routes connected a central controller to a plurality of nodes are established in the network through a spanning tree protocol and a plurality of second routes between the plurality of nodes in the network through the spanning tree protocol, the method comprising: enabling a firewall of each of the nodes to block the second routes; disabling a spanning tree protocol function of each of the nodes; populating a forwarding table of each of the nodes with a plurality of predetermined routing paths; and flushing the firewall of each of the nodes, wherein a plurality of third routes between the central controller and the plurality of nodes are established according to the predetermined routing paths without the spanning tree protocol, after the firewall of each of the nodes is flushed.

One of exemplary embodiments comprises a central controller for a network, wherein a plurality of first routes connected the central controller to a plurality of nodes are established in the network through a spanning tree protocol and a plurality of second routes between the plurality of nodes in the network through the spanning tree protocol. The central controller comprises a processor; and a memory coupled to the processor and having a plurality of instructions, wherein the processor executes the instructions to: give commands to the nodes to enable a firewall of each of the nodes to block the second routes; give commands to the nodes to disable a spanning tree protocol function of each of the nodes; give commands to the nodes to populate a forwarding table of each of the nodes with a plurality of predetermined routing paths; and give commands to the nodes to flush the firewall of each of the nodes, wherein a plurality of third routes between the central controller and the plurality of nodes are established according to the predetermined routing paths without the spanning tree protocol, after the firewall of each of the nodes is flushed.

One of exemplary embodiments comprises a data center network system including a central controller, a plurality of switches, a plurality of servers and a network, wherein a plurality of first routes connecting the central controller to the switches and the servers are established in the network through a spanning tree protocol and a plurality of second routes between the switches and the servers in the network through the spanning tree protocol. The central controller gives commands to the switches and the servers to enable a firewall of each of the switches and the servers to block the second routes, give commands to the switches and the servers to disable a spanning tree protocol function of each of the switches and the servers, give commands to the switches and the servers to populate a forwarding table of each of the switches and the servers with a plurality of predetermined routing paths, and give commands to the switches and the servers to flush the firewall of each of the switches and the servers, wherein a plurality of third routes between the central controller, the switches and the servers are established according to the predetermined routing paths without the spanning tree protocol, after the firewall of each of the nodes is flushed.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
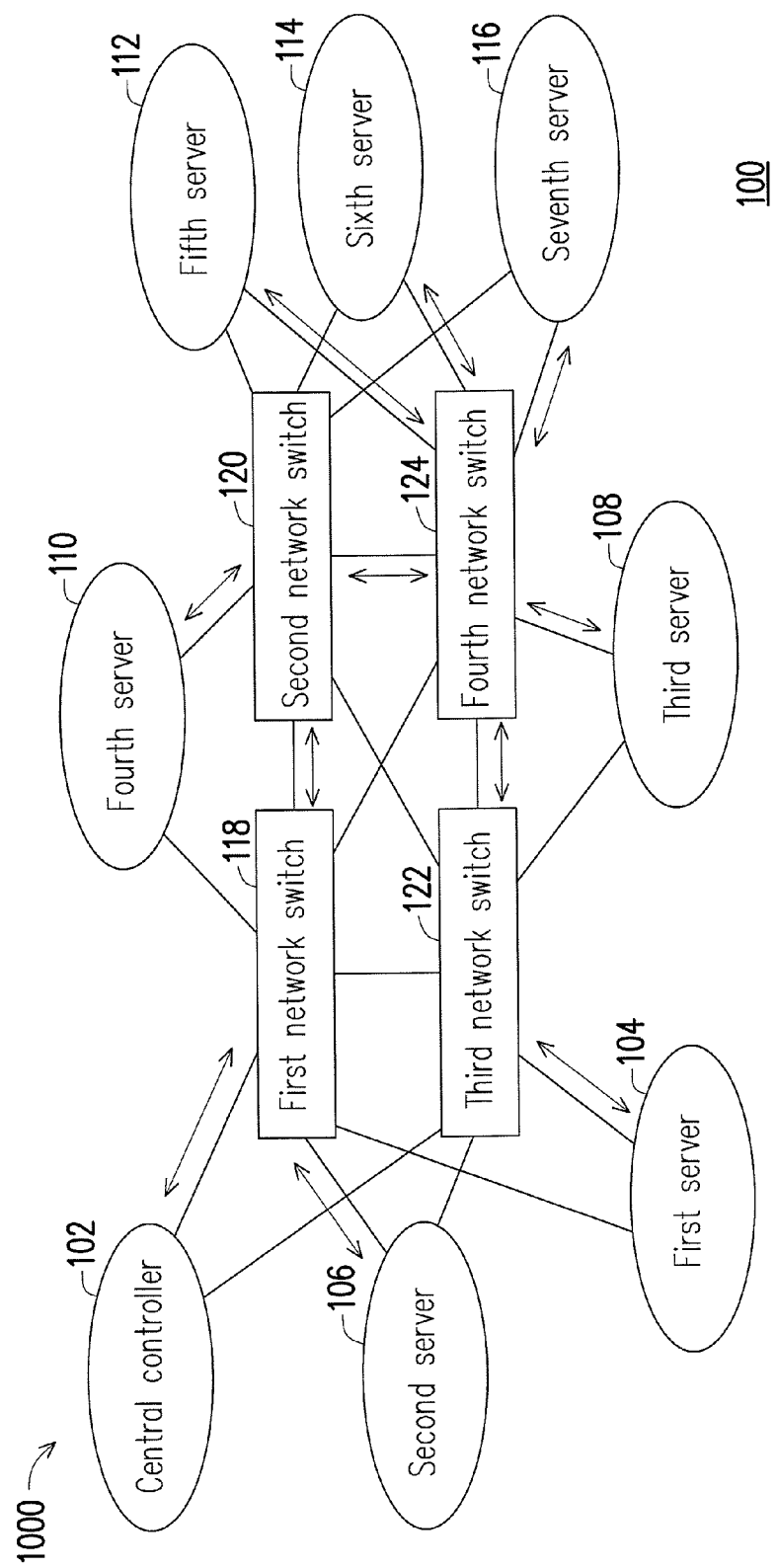
FIG. 1 is a schematic diagram illustrating a data center network system according to an exemplary embodiment of the disclosure.

FIG. 1 is a schematic diagram illustrating a data center network system according to an exemplary embodiment of the disclosure.

Referring to FIG. 1, the data center network system 100 includes a central controller 102, a first server 104, a second server 106, a third server 108, a fourth server 110, a fifth server 112, a sixth server 114, a seventh server 116, a first network switch 118, a second network switch 120, a third network switch 122 and a fourth network switch 124. In the present exemplary embodiment, the data center network system 100 deploying seven servers and four switches is taken as an example. However, the present disclosure is not limited thereto. In another exemplary embodiment, more servers and network switches may be deployed in the data center network system 100.

The central controller 102, the first server 104, the second server 106, the third server 108, the fourth server 110, the fifth server 112, the sixth server 114, the seventh server 116, the first network switch 118, the second network switch 120, the third network switch 122 and the fourth network switch 124 are connected to form a network 1000. For example, the network 1000 is a layer two network. Herein, the first server 104, the second server 106, the third server 108, the fourth server 110, the fifth server 112, the sixth server 114, the seventh server 116, the first network switch 118, the second network switch 120, the third network switch 122 and the fourth network switch 124 are also referred to as nodes in the network 1000.

The central controller 102 is configured to manage all of physical machines, virtual machines and network switches connected in the data center network system 100. For example, the central controller 102 is a server, and stores related management information, where the management information includes related information of the virtual machines operated in the physical machines and information of network switches connected to the physical machines.

The first server 104, the second server 106, the third server 108, the fourth server 110, the fifth server 112, the sixth server 114 and the seventh server 116 are physical hosts deployed in the data center network system 100. The first server 104, the second server 106, the third server 108, the fourth server 110, the fifth server 112, the sixth server 114 and the seventh server 116 can respectively run one or a plurality of virtual machines to provide different services. For example, the first server 104, the second server 106, the third server 108, the fourth server 110, the fifth server 112, the sixth server 114 and the seventh server 116 respectively are equipped with virtual bridges inside, and the virtual bridges are capable of enabling/disabling a spanning three protocol (STP) function, configuring STP related options, setting firewall rules and populating a forwarding table.

The first network switch 118, the second network switch 120, the third network switch 122 and the fourth network switch 124 are deployed between the central controller 102, the first server 104, the second server 106, the third server 108, the fourth server 110, the fifth server 112, the sixth server 114 and the seventh server 116, and are used for forwarding data packets. For example, the first network switch 118, the second network switch 120, the third network switch 122 and the fourth network switch 124 are layer two switches and capable of enabling/disabling a spanning three protocol (STP) function, configuring STP related options, allowing/blocking broadcast, multicast and unknown unicast data packets, populating a forwarding table and being remote configurable by a command-line interface (CLI) or a simple network management protocol (SNMP) interface.

In the present exemplary embodiment, the central controller 102, the first server 104, the second server 106, the third server 108, the fourth server 110, the fifth server 112, the sixth server 114, the seventh server 116, the first network switch 118, the second network switch 120, the third network switch 122 and the fourth network switch 124 are deployed in the data center network system 100 initially with the spanning three protocol (STP), thereby preventing loops in the network 1000. To be specific, when the data center network system 100 is established initially, the STP function of the central controller 102 and the STP functions the nodes in the network 1000 are enabled, and routes between the central controller 102 and the nodes in the network 1000 are calculated according to the STP to form a STP topology.

For example, referring to FIG. 1, routes between the central controller 102, the first server 104, the second server 106, the third server 108, the fourth server 110, the fifth server 112, the sixth server 114, the seventh server 116, the first network switch 118, the second network switch 120, the third network switch 122 and the fourth network switch 124 are calculated, the fourth network switch 124 is selected as a SPT root and a STP topology (i.e., lines with arrows) is formed. For example, data packets between the central controller 102 and the seventh server 116 are forwarded via the first network switch 118, the second network switch 120 and the fourth network switch 124. Forming a STP topology in a network is well known by people skilled in the art, and therefore the detailed operations for establishing a spanning tree are omitted herein.

In the present exemplary embodiment, the central controller 102 or another routing component is configured to calculate routing paths for the data center network system 100 (herein also referred to as "predetermined routing paths". For example, the predetermined routing paths are calculated for more effectively utilizing all of the bandwidth of the network 1000 based on a routing algorithm. In particular, the central controller 102 converts the routing mode of the data center network system 100 from the SPT mode to a mode without the SPT (herein referred to as "the explicitly routed mesh mode") according to the predetermined routing paths.

Figure 2:
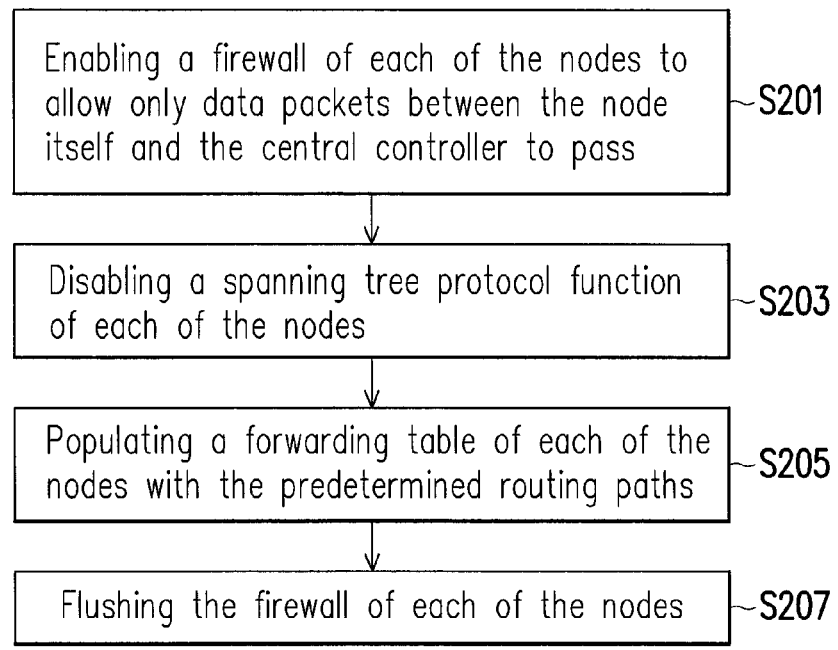
FIG. 2 is a flowchart illustrating a method of converting a routing mode of a network according to an exemplary embodiment of the disclosure.

FIG. 2 is a flowchart illustrating a method of converting a routing mode of a network according to an exemplary embodiment of the disclosure.

Referring to FIG. 2, the method of converting the routing mode of the data center network system 100 form the mode with the SPT to a mode without the SPT includes a phase I and a phase II.

In the phase I, a firewall of each of the nodes is enabled to allow only data packets between the node itself and the central controller 102 to pass (S201), a spanning tree protocol function of each of the nodes is disabled (S203) and a forwarding table of each of the nodes is populated with the predetermined routing paths (S205). "FIG. 2 S201, S203, and S205 are not limited to the flowchart order."

Figure 3:
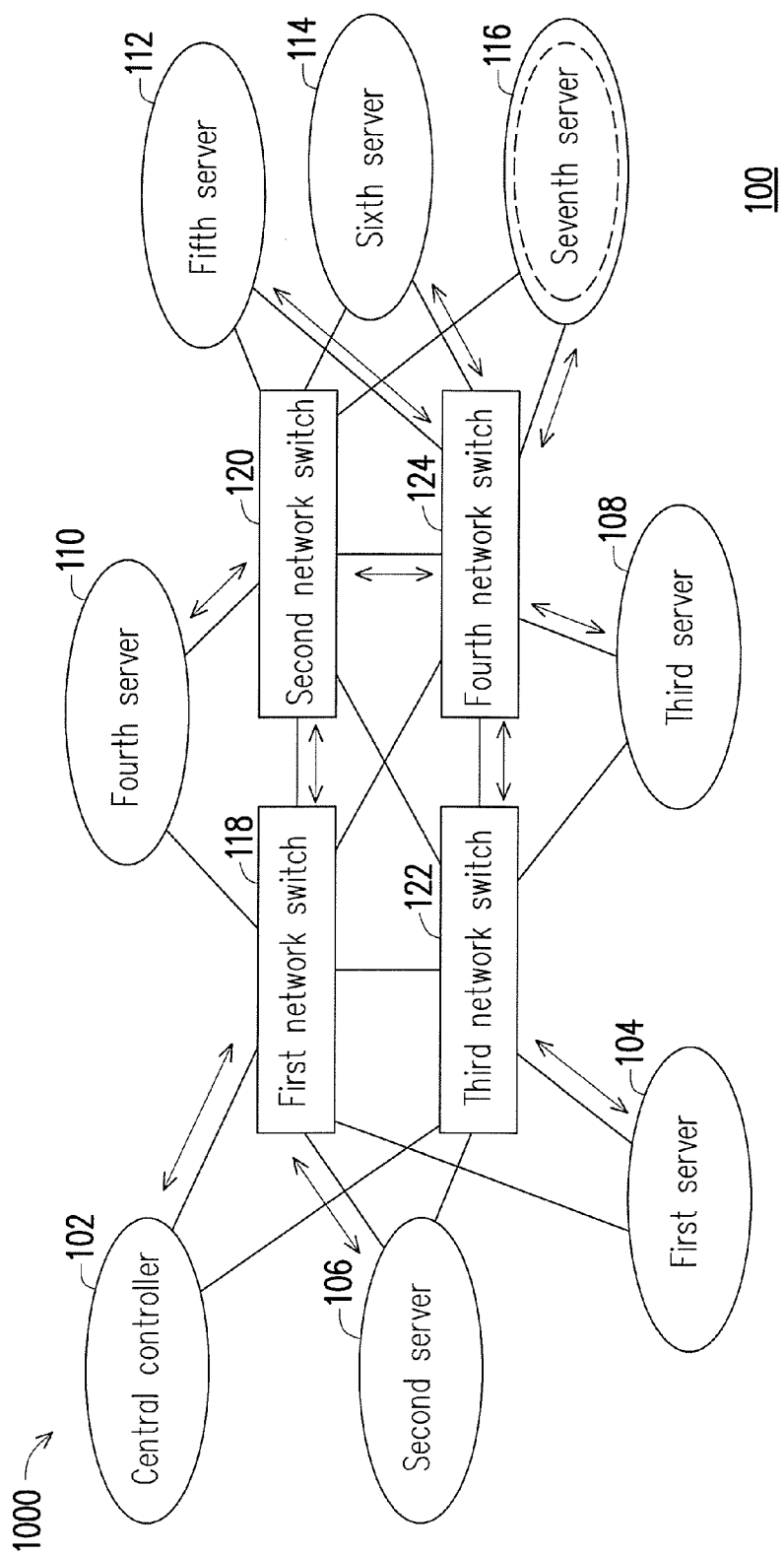
FIGS. 3-5 are an example of performing the phase I for a node according to an exemplary embodiment of the disclosure.
Figure 4:
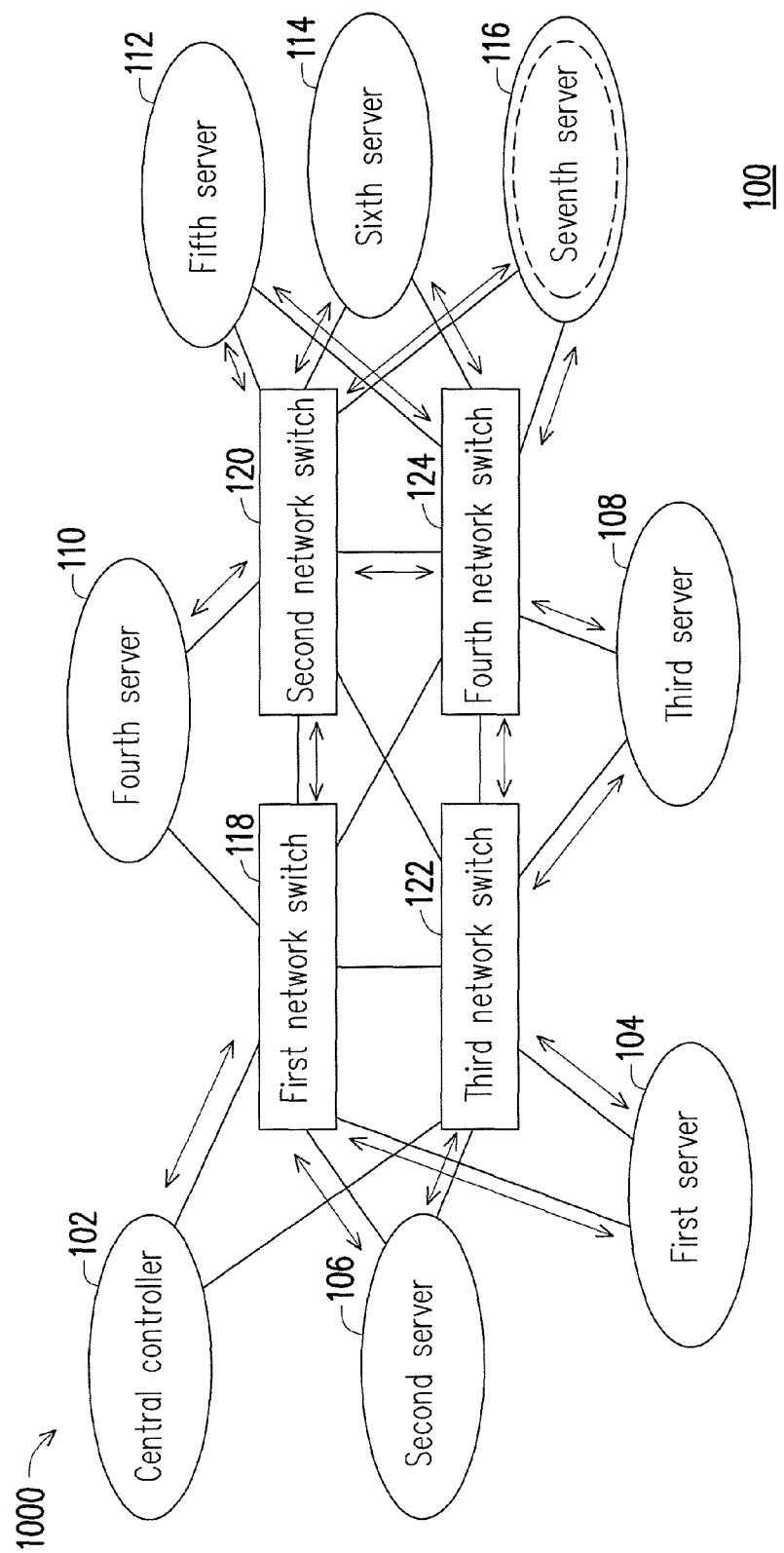
Figure 5:
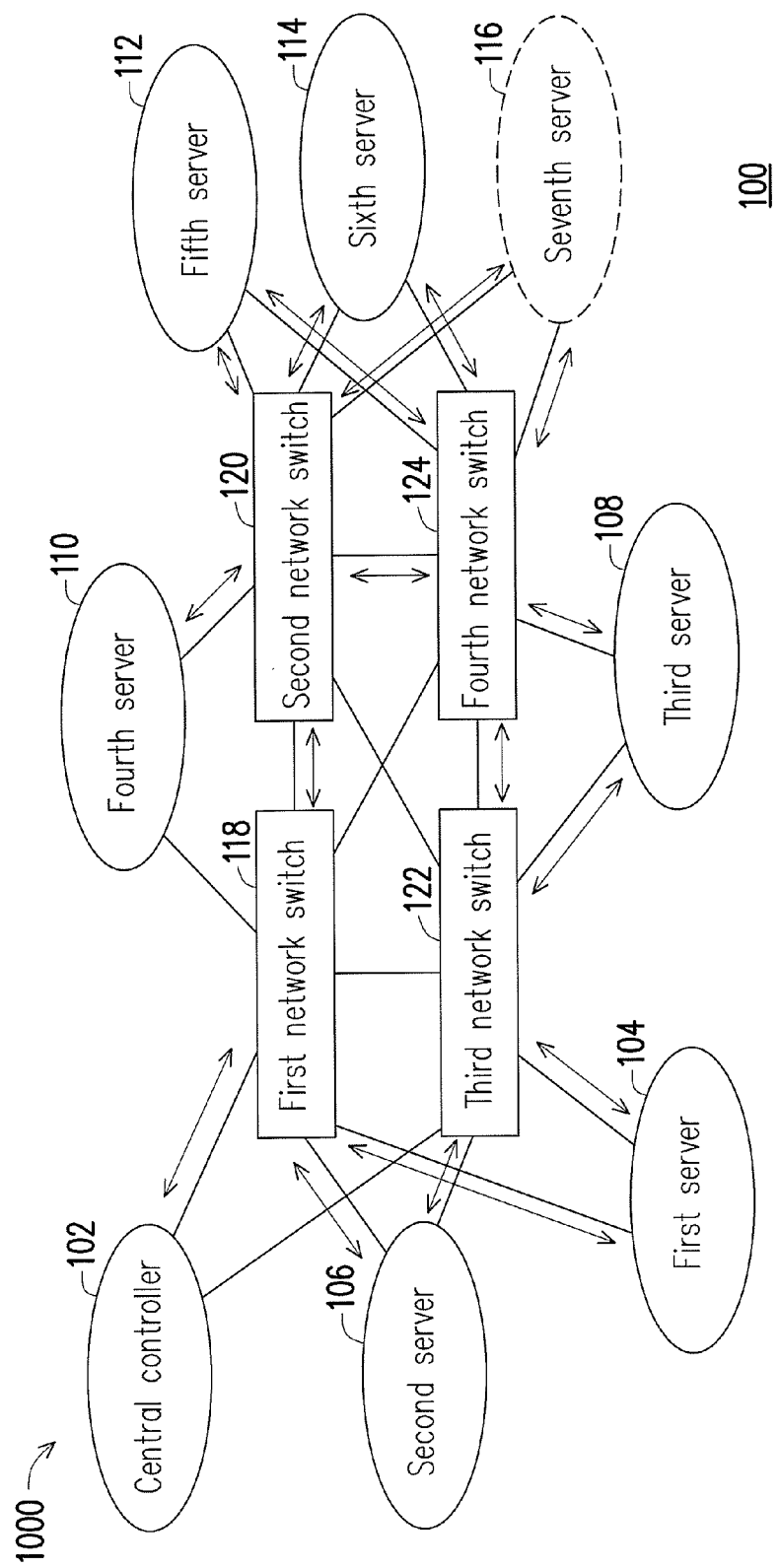

FIGS. 3-5 are an example of performing the phase I for a node according to an exemplary embodiment of the disclosure.

Referring to FIG. 3, the SPT is used for establishing a plurality of first routes between the central controller 102 and the nodes (i.e., the first server 104, the second server 106, the third server 108, the fourth server 110, the fifth server 112, the sixth server 114, the seventh server 116, the first network switch 118, the second network switch 120, the third network switch 122 and the fourth network switch 124) in the data center network system 100 and a plurality of second routes between the nodes.

When the conversion of the routing mode is activated, a node in the data center network system 100 is selected. For example, the central controller 102 selects the seventh server 116. Then, the central controller 102 gives a command to the seventh server 116 to enable a firewall of the seventh server 116 to allow only data packets between the seventh server 116 and the central controller 102 to pass. That is, the second routes connected to the seventh server 116 from other nodes are blocked and the first route between the seventh server 116 and the central controller 102 is unobstructed.

Additionally, in an exemplary embodiment, when a node to be selected for performing the phase I is a physical switch, the firewall of the physical switch further be configured to block the broadcast, multicast, and unknown unicast packets. This set of firewalls is enabled to prevent broadcast storm and should not be flushed even in the explicitly routed mesh mode.

Referring to FIG. 4, after the firewall of the seventh server 116 is enabled, the central controller 102 gives a command to the seventh server 116 to disable the spanning tree protocol function of the seventh server 116.

Referring to FIG. 5, after the spanning tree protocol function of the seventh server 116 is disabled, the central controller 102 gives a command to the seventh server 116 to populate the forwarding table of the seventh server 116 with the predetermined routing paths. To be specific, the central controller 102 indicates the seventh server 116 to record forwarding information into the forwarding table thereof.

In the present exemplary embodiment, the central controller 102 selects the nodes deployed in the data center network system 100 to perform the phase I, one by one. For example, the central controller 102 first selects a first node (e.g., the seventh server 116) to perform with the above-mentioned phase I, and after the first node completed the above-mentioned phase I, the central controller 102 selects a second node (e.g., the sixth server 114) to perform the phase I.

In particular, every when the SPT function of one node is disabled in the data center network system 100, a new spanning tree topology for the data center network system 100 is re-calculated and before the new spanning tree topology converges stably, data packets can not be transmitted reliably. In another exemplary embodiment, the central controller 102 is further configured to determine whether a new spanning tree topology is converged in the data center network system 100 after giving a command to one node to disable the spanning tree protocol function thereof. For example, after giving the command to the seventh server 116 to disable the spanning tree protocol function of the seventh server 116, the central controller 102 may determine whether remaining nodes running the spanning tree protocol in the data center network system 100 point to the same spanning tree protocol root. And, when a node recognized as a spanning tree protocol root by all nodes running the spanning tree protocol in the data center network system 100 is the same node, a new spanning tree topology is formed stably. Additionally, in another exemplary embodiment, the central controller 102 may ping remaining nodes running the spanning tree protocol in the network once per an interval time; and if the remaining nodes running the spanning tree protocol reply successfully and continuously for a predetermined number, identifying the new spanning tree topology is converged in the data center network system 100. For example, the interval time is set as the HELLO time of the STP configuration and the predetermined number is set as 3, though the disclosure is not limited thereto.

Furthermore, the step of determining whether a new spanning tree topology is converged in the data center network system 100 will extending the time for performing the above-mentioned phase I, in another exemplary embodiment, the central controller 102 is further to change a STP root before converting the routing mode of the data center network system 100, thereby preventing the spanning tree topology from re-calculating. For example, the central controller 102 sets a node (e.g., the first network switch 118) directly connected to the central controller 102 as a spanning tree protocol root and first selects nodes belonging to the STP leaf node to perform the above-mentioned phase I. Because the operation of disabling the SPT functions of the nodes belonging to the STP leaf node will not cause the re-calculating of the spanning tree topology, the waiting time for the STP convergence can be avoided.

In the present exemplary embodiment, the central controller 102 selects the nodes deployed in the data center network system 100 to perform the above-mentioned phase I according to a predetermined order, and when the firewall of the selected node is enabled, routes between the central controller 102 and remaining nodes, whose forwarding tables have not be populated with the predetermined routing paths, are not blocked. To be specific, in the present exemplary embodiment, the nodes deployed in the data center network system 100 are performed with the above-mentioned phase I one by one. If a route between the central controller 102 and a node is blocked before populating the forwarding table of the node, the node will not be performed with the above-mentioned phase I. For example, as shown in FIG. 1, if the first server 104, the fifth server 112, the second network switch 120 and the third network switch 122 are first selected to perform with the above-mentioned phase I, the central controller 102 cant not give commands to the third server 108, the sixth server 114, the seventh server 116 and the fourth network switch 124 via the network 1000 after the firewalls of the first server 104, the fifth server 112, the second network switch 120 and the third network switch 122 are enabled.

For example, because servers are usually spanning tree protocol leaf nodes, in another exemplary embodiment, the central controller 102 may first select the servers in the data center network system 100 to perform the above-mentioned phase I. After all of the servers have been performed with the above-mentioned phase I, the central controller 102 selects the network switches in the data center network system 100 from the farthest one to the nearest one to perform the above-mentioned phase I. Accordingly, routes between the central controller 102 and nodes, whose forwarding tables have not be populated with the predetermined routing paths, are not blocked.

Furthermore, after the SPT function of a node (e.g., the seventh server 116) is disabled and the forwarding table of the node is populated, if the originally blocked port of the node has not changed to a forwarding state and is selected for routing, the connection may break for several seconds. In another exemplary embodiment, the central controller 102 is further configured to change the media access control (MAC) address thereof before converting the routing mode of the data center network system 100. To be specific, before converting the routing mode of the data center network system 100, the central controller 102 changes the original MAC address to a temporary MAC address. Accordingly, it can avoid the connection from breaking.

Referring to FIG. 2 again, after steps of enabling a firewall (S201), disabling a spanning tree protocol function (S203), and populating a forwarding table (S205), in the phase II, the firewall of each of the nodes is flushed (S207). To be specific, the central controller 102 gives commands to each of the nodes to flush their firewall. For example, the central controller 102 gives commands to each of the nodes to flush the firewalls of the nodes sequentially from the nearest node to the farthest node according to the predetermined routing paths. In particular, after the firewalls of the nodes is flushed, a plurality of new routes (herein also referred to as "third routes") between the central controller 102 and the nodes deployed in the data center network system 100 are established according to the predetermined routing paths without the spanning tree protocol. Accordingly, the routing mode of the data center network system 100 is converted successfully from the SPT mode to the explicitly routed mesh mode.

In the present exemplary embodiment, the central controller 102 selects the nodes deployed in the data center network system 100 to perform the phase I, one by one. However, the disclosure is not limited thereto. In another exemplary embodiment, the central controller 102 may give commands to nodes belonging to a spanning tree leaf node to perform the above-mentioned phase I, simultaneously. For example, as shown in FIG. 1, the central controller 102 may simultaneously give commands to the first server 104, the second server 106, the third sever 108, the forth server 110, the fifth sever 112, the sixth sever 114 and the seventh server 116, thereby respectively enabling the firewalls of the first server 104, the second server 106, the third sever 108, the forth server 110, the fifth sever 112, the sixth sever 114 and the seventh server 116 substantially in parallel, disabling the STP functions of the first server 104, the second server 106, the third sever 108, the forth server 110, the fifth sever 112, the sixth sever 114 and the seventh server 116 substantially in parallel and populating the forwarding tables of the first server 104, the second server 106, the third sever 108, the forth server 110, the fifth sever 112, the sixth sever 114 and the seventh server 116 based on the predetermined routing paths substantially in parallel. In particular, all configuration commands for the above-mentioned phase I may be combined into one script file and the nodes belonging to a spanning tree leaf node may be executed the script file to process the above-mentioned phase I substantially in parallel.

It should be noted, the sequence of the steps shown in FIG. 2 is not limited. To be specific, when the predetermined routing paths (i.e., the third routes) are the same as the routes of the original STP topology (i.e., the first routes and the second routes), the central controller 102 may populate the forwarding table of each of the nodes with the predetermined routing paths before enabling the firewall of each of the nodes to block the second routes. Or, the central controller 102 may populate the forwarding table of each of the nodes with the predetermined routing paths after enabling the firewall of each of the nodes to block the second routes and before disabling the spanning tree protocol function of each of the nodes.

In the present exemplary embodiment, the central controller 102 and the nodes (i.e., the first server 104, the second server 106, the third server 108, the fourth server 110, the fifth server 112, the sixth server 114, the seventh server 116, the first network switch 118, the second network switch 120, the third network switch 122 and the fourth network switch 124) exist in the same layer two domain. However, the present disclosure is not limited thereto.

For example, in another exemplary embodiment, the central controller 102 may exist in another layer two domain. In this exemplary embodiment, a gateway of the network 1000 may work as a controller proxy and convert the routing mode of the data center network system 100 from the mode with the STP to a mode without the STP according to the commands received from the central controller 102. In particular, since the broadcast packets, including the address resolution protocol (ARP) packets, are blocked by the physical switches, these nodes, including the gateway, cannot know each other's MAC addresses and then cannot communicate with each other. For example, in an exemplary embodiment, the ARP table of all the nodes in the network 1000 is set such that the nodes can communicate with each other without sending ARP packet to ask each other's MAC addresses. Additionally, in another exemplary embodiment, a broadcast tree is established in the network 1000 for forwarding the broadcast packets. To be specific, in the network 1000, some switch ports are set to be broadcast enabled and the others are broadcast disabled, thereby the broadcast enabled ports form a tree topology which is referred as a broadcast tree. In principle, with the broadcast tree, the broadcast packets, including the ARP packets, can pass through the network 1000 without casing a broadcast storm.

In the present exemplary embodiment, the central controller 102 periodically detect whether a new node (e.g., a server or a network switch) is added into the data center network system 100. And, if a new node is added, the central controller 102 incorporates the new node into the data center network system 100 running with the explicitly routed mesh mode.

Figure 6:
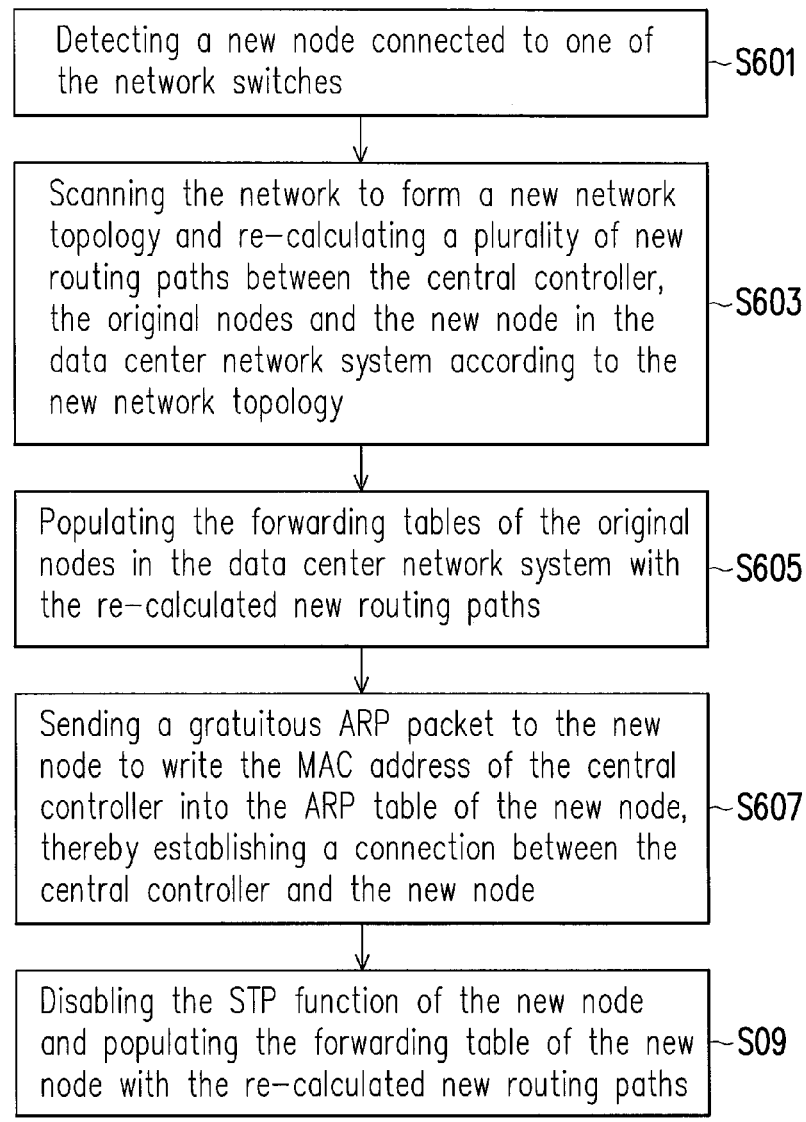
FIG. 6 is a flowchart illustrating a method of incorporating a new node into the data center network system without the SPT according to an exemplary embodiment of the disclosure.

FIG. 6 is a flowchart illustrating a method of incorporating a new node into the data center network system without the SPT according to an exemplary embodiment of the disclosure.

Referring to FIG. 6, in step S601, the central controller 102 detects a new node connected to one of the network switches.

For example, the central controller 102 periodically read link layer discovery protocol (LLDP) tables from the first network switch 118, the second network switch 120, the third network switch 122 and the forth network switch 124 to form the latest network topology. To be specific, when a new node supporting the LLDP is added into the data center network system 100, the information about the new node will be shown in the LLDP tables of the first network switch 118, the second network switch 120, the third network switch 122 and the forth network switch 124 and therefore the new node can be detected by the central controller 102.

Additionally, when a new node is connected to a network switch, a link up event occurs in the network switch. In another exemplary embodiment, the first network switch 118, the second network switch 120, the third network switch 122 and the forth network switch 124 are configured to send a notification to the central controller 102 when the link up event is triggered. Accordingly, the central controller 102 may receive the notification for detecting a new node.

In step S603, the central controller 102 scans the network 1000 to form a new network topology and re-calculate a plurality of new routing paths between the central controller 102 and the original nodes (i.e., the first server 104, the second server 106, the third server 108, the fourth server 110, the fifth server 112, the sixth server 114, the seventh server 116, the first network switch 118, the second network switch 120, the third network switch 122 and the fourth network switch 124) and the new node deployed in the data center network system 100 according to the new network topology. For example, the central controller 102 reads the LLDP tables of the first network switch 118, the second network switch 120, the third network switch 122 and the forth network switch 124 and forms the new network topology according to the read LLDP tables.

In step S605, the central controller 102 populates the forwarding tables of the original nodes in the data center network system 100 with the re-calculated new routing paths.

Then, in step S607, the central controller 102 sends a gratuitous ARP packet to the new node to write the MAC address of the central controller 102 into the ARP table of the new node, thereby establishing a connection between the central controller 102 and the new node.

Finally, in step S609, the central controller 102 disable the STP function of the new node and populates the forwarding table of the new node with the re-calculated new routing paths. Accordingly, the new node is incorporated successfully into the data center network system 100 running with the explicitly routed mesh mode.

In the present exemplary embodiment, when a node is about to remove from the data center network system 100 running with the explicitly routed mesh mode, the central controller 102 re-calculate a plurality of new routing paths between the central controller 102 and the remaining nodes and populates the forwarding tables of the remaining nodes deployed in the data center network system 100.

Figure 7:
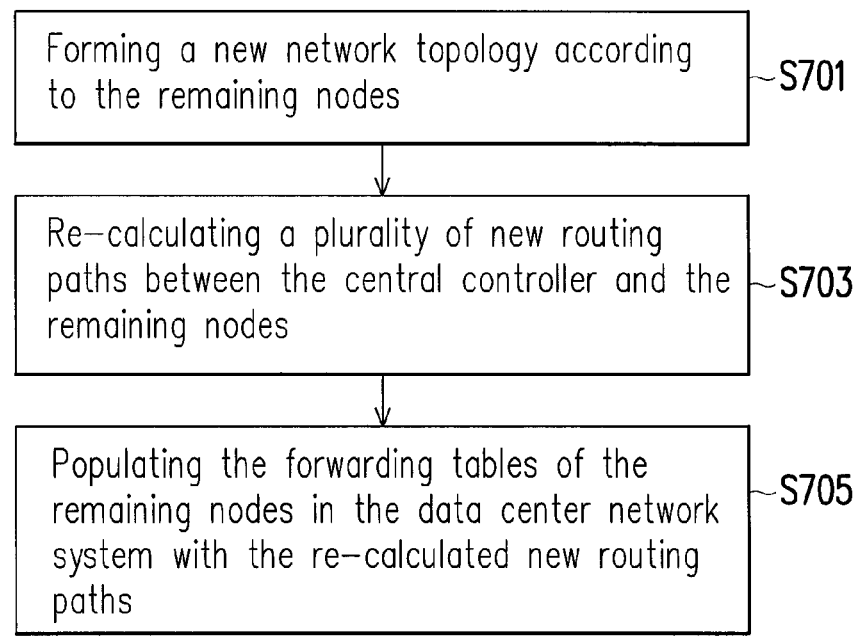
FIG. 7 is a flowchart illustrating a method of removing an old node from the data center network system without the SPT according to an exemplary embodiment of the disclosure.

FIG. 7 is a flowchart illustrating a method of removing an old node from the data center network system without the SPT according to an exemplary embodiment of the disclosure.

Referring to FIG. 7, when a node is about to remove from the data center network system 100 running with the explicitly routed mesh mode, in step S701, the central controller 102 forms a new network topology according to the remaining nodes.

Then, in step S703, the central controller 102 re-calculates a plurality of new routing paths between the central controller 102 and the remaining nodes.

Finally, in step S705, the central controller 102 populates the forwarding tables of the remaining nodes in the data center network system 100 with the re-calculated new routing paths. Accordingly, there is no routing path passing through the node to be removed, and the node can be removed safely from the data center network system 100 running with the explicitly routed mesh mode.

Figure 8:
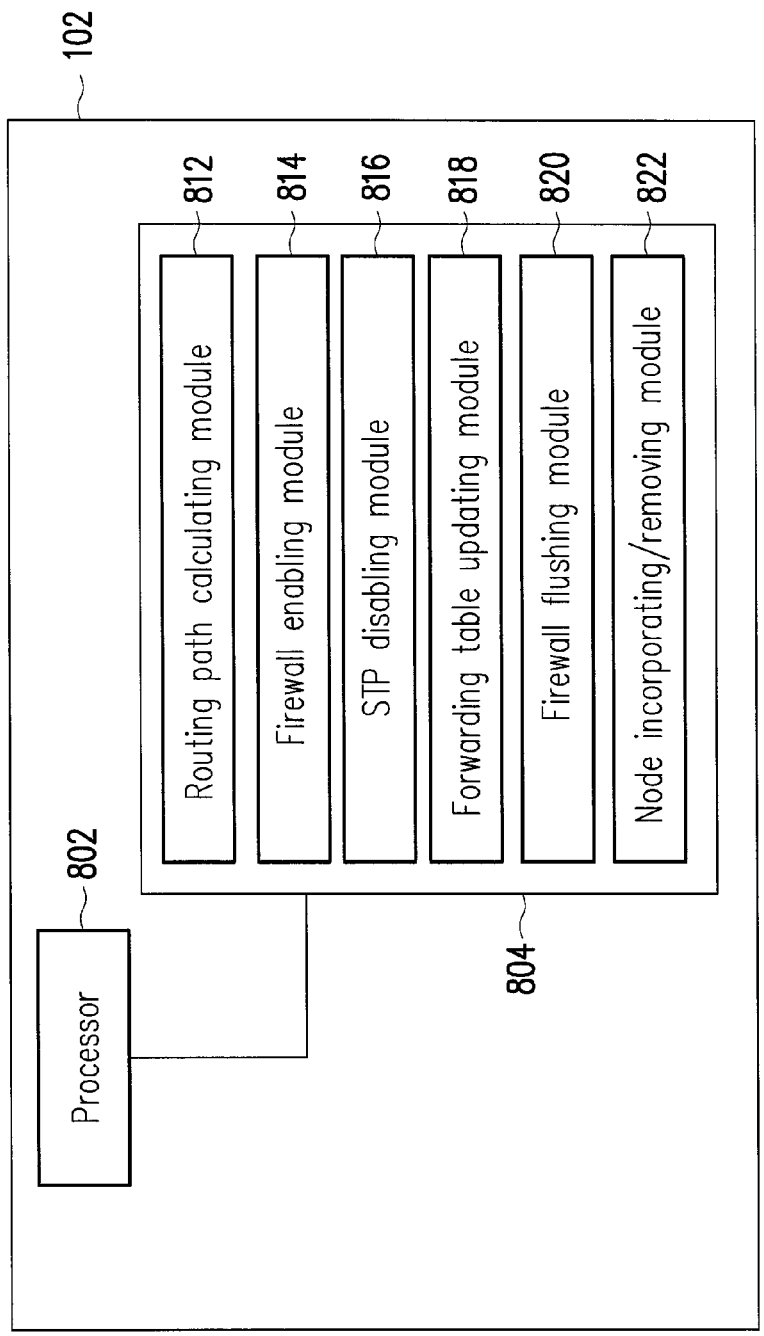
FIG. 8 is a schematic diagram illustrating a central controller according to an exemplary embodiment of the disclosure.

FIG. 8 is a schematic diagram illustrating a central controller according to an exemplary embodiment of the disclosure.

Referring to FIG. 8, the central controller 102 includes a processor 802 and a memory 804.

The processor 802 is configured to control a whole operation of the central controller 102. For example, the processor 802 is a central processing unit (CPU), and the disclosure is not limited thereto.

The memory 804 is configured to store data. For example, the memory 804 is a static random-access memory (SRAM), a dynamic random access memory, flash memory or other memories, and the disclosure is not limited thereto. In particular, the memory 804 stores a plurality of instructions, and the processor 802 executes the instructions to converts the routing mode of the data center network system 100 from the STP mode to the explicitly routed mesh mode.

To be specific, the above-mentioned instructions includes a routing path calculating module 812, a firewall enabling module 814, a STP disabling module 816, a forwarding table updating module 818, a firewall flushing module 820 and a node incorporating/removing module 822. Herein, the processor 802 runs the routing path calculating module 812 to form a network topology and calculate routing paths according to nodes in the data center network system 100; runs the firewall enabling module 814 to enable the firewall of each of the nodes to block the routes between the nodes deployed in the data center network system 100; runs the STP disabling module 816 disable the spanning tree protocol function of each of the nodes; runs the forwarding table updating module 818 to populate the forwarding table of each of the nodes; runs the firewall flushing module 820 to flush the firewall of each of the nodes; and runs the node incorporating/removing module 822 to detect a node to be added or removed. It should be noted that even though the routing path calculating module 812 is configured in the central controller 102 in the exemplary embodiment shown in FIG. 8, however, in another exemplary embodiment, the routing path calculating module 812 may be configured in another server.

In addition, the above-mentioned instructions may be stored in a computer-readable recording medium including a CD-ROM, a magnetic tape, a floppy disc, or an optical data storage device.

In summary, the method of converting a routing mode of a network provided by the exemplary embodiments of the disclosure can gracefully convert a running layer two network from the STP mode into the explicitly routed mesh mode without the STP. Accordingly, all the bandwidth of the network can be effectively utilized and the routing in the network can be more efficiently.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method of converting a routing mode of a network, a plurality of first routes connecting a central controller to a plurality of nodes are established in the network through a spanning tree protocol and a plurality of second routes between the plurality of nodes in the network through the spanning tree protocol, the method comprising:
    enabling a firewall of each of the nodes to block the second routes;
    after enabling the firewall, disabling a spanning tree protocol function of each of the nodes;
    after disabling the spanning tree protocol function, populating a forwarding table of each of the nodes with a plurality of predetermined routing paths; and
    after populating the forwarding table, flushing the firewall of each of the nodes,
    wherein a plurality of third routes between the central controller and the plurality of nodes are established according to the predetermined routing paths without the spanning tree protocol, after the firewall of each of the nodes is flushed;
    wherein the steps of enabling the firewall of each of the nodes to block the second routes, disabling the spanning tree protocol function of each of the nodes and populating the forwarding table of each of the nodes with the predetermined routing paths comprise:
    according to a predetermined order, enabling a first firewall of a first node among the nodes to block at least one of the second routes, disabling the spanning tree protocol function of the first node and populating the forwarding table of the first node with the predetermined routing paths; and after the forwarding table of the first node is populated with the predetermined routing paths, enabling a second firewall of a second node among the nodes to block at least one of the second routes, disabling the spanning tree protocol function of the second node and populating the forwarding table of the second node with the predetermined routing paths,
    wherein when enabling the firewall of any one of the nodes according to the predetermined order, other routes connecting the central controller to the other nodes are not blocked, wherein forwarding tables of the other nodes have not been populated with the predetermined routing paths.

2. The method as claimed in claim 1, wherein the step of flushing the firewall of each of the nodes comprises:
    flushing the firewall of each of the nodes sequentially from a nearest node to a farthest node according to the predetermined routing paths.

3. The method as claimed in claim 1, further comprising:
   determining whether a new spanning tree topology is converged in the network after disabling the spanning tree protocol function of one of the nodes.

4. The method as claimed in claim 3, wherein the step of determining whether the new spanning tree topology is converged in the network comprises:
   determining whether a plurality of remaining nodes running the spanning tree protocol among the nodes in the network point to a same spanning tree protocol root; and
   identifying the new spanning tree topology is converged in the network if the plurality of remaining nodes running the spanning tree protocol point to the same spanning tree protocol root.

5. The method as claimed in claim 3, wherein the step of determining whether the new spanning tree topology is converged in the network comprises:
   pinging the plurality of remaining nodes running the spanning tree protocol in the network once per an interval time; and
   identifying the new spanning tree topology is converged in the network if the plurality of remaining nodes running the spanning tree protocol reply successfully and continuously for a predetermined number.

6. The method as claimed in claim 1, further comprising:
   changing a media access control (MAC) address of the central controller to a temporary MAC address before the steps of enabling the firewall of each of the nodes to block the second routes, disabling the spanning tree protocol function of each of the nodes and populating the forwarding table of each of the nodes with the predetermined routing paths.

7. The method as claimed in claim 1, wherein the steps of enabling the firewall of each of the nodes to block the second routes, disabling the spanning tree protocol function of each of the nodes and populating the forwarding table of each of the nodes with the predetermined routing paths comprise:
   enabling firewall of each of nodes belonging to a spanning tree protocol leaf node among the nodes in parallel;
   disabling spanning tree protocol functions of the nodes belonging to the spanning tree protocol leaf node in parallel and populating forwarding tables of the nodes belonging to the spanning tree protocol leaf node in parallel.

8. The method as claimed in claim 1, further comprising:
   setting a node directly connected to the central controller among the nodes as a spanning tree protocol root before the steps of enabling the firewall of each of the nodes to block the second routes, disabling the spanning tree protocol function of each of the nodes and populating the forwarding table of each of the nodes with the predetermined routing paths.

9. The method as claimed in claim 1, wherein if the plurality of third routes are the same as the plurality of first routes and the second routes, the step of populating the forwarding table of each of the nodes with the predetermined routing paths is performed before tire step of enabling the firewall of each of the nodes to block the second routes or between tire step of enabling tire firewall of each of the nodes to block the second routes and the step of disabling the spanning tree protocol function of each of the nodes.

10. The method as claimed in claim 1, wherein the steps of enabling the firewall of each of the nodes to block the second routes, disabling the spanning tree protocol function of each of the nodes and populating the forwarding table of each of the nodes with the predetermined routing paths comprise:
    combining configurations commands into a plurality of script files respectively for nodes belonging to a spanning tree protocol leaf node among the nodes; and
    executing the plurality of script files respectively in the nodes belonging to tire spanning tree protocol leaf node to enable the firewall of each of the nodes belonging to a spanning tree protocol leaf node, disable the spanning tree protocol function of each of the nodes belonging to the spanning tree protocol leaf node and populate forwarding tables of the nodes belonging to the spanning tree protocol leaf node.

11. The method as claimed in claim 1, wherein the central controller connects to the nodes through a gateway.

12. The method as claimed in claim 1, further comprising:
    detecting a new node in the network by periodically reading a link layer discovery protocol table or triggering a link up event;
    populating the forwarding table of each of the nodes with a plurality of new routing paths;
    sending a gratuitous address resolution protocol packet to the new node;
    disabling the spanning tree protocol function of the new node; and
    populating the forwarding table of the new node with the plurality of new routing paths.

13. The method as claimed in claim 1, further comprising:
    obtaining a plurality of new routing paths, wherein an old node among the
    nodes is removed in the plurality of new routing paths;
    populating the forwarding table of each of the nodes with the plurality of new routing paths; and
    removing the old node from the network.

14. A central controller for a network, a plurality of first routes connecting the central controller to a plurality of nodes are established in the network through a spanning tree protocol and a plurality of second routes between the plurality of nodes in the network through the spanning tree protocol, the central controller comprising:
    a processor; and
    a memory coupled to the processor and having a plurality of instructions, wherein the processor executes the plurality of instructions to:
    give commands to the nodes to enable a firewall of each of the nodes to block the second routes;
    give commands to the nodes to disable a spanning tree protocol function of each of the nodes after the firewall is enabled;
    give commands to the nodes to populate a forwarding table of each of the nodes with a plurality of predetermined routing paths after the spanning tree protocol function is disabled; and
    give commands to the nodes to flush the firewall of each of the nodes after the forwarding table is populated,
    wherein a plurality of third routes between the central controller and the plurality of nodes are established according to the predetermined routing paths without the spanning tree protocol, after the firewall of each of the nodes is flushed,
    wherein the steps of enabling the firewall of each of the nodes to block the second routes, disabling the spanning tree protocol function of each of the nodes and populating the forwarding table of each of the nodes with the predetermined routing paths comprise:
    according to a predetermined order, giving commands to a first node among the nodes to enable a first firewall of the first node to block at least one of the second routes, disable a spanning tree protocol function of the first node and populating a forwarding table of the first node with the predetermined routing paths; and after the forwarding table of the first node is populated with the predetermined routing paths, according to the predetermined order, giving commands to a second node among the nodes to enable a second firewall of the second node to block at least one of the second routes, disable a spanning tree protocol function of the second node and populate a forwarding table of the second node with the predetermined routing paths, wherein when enabling the firewall of any one of the nodes according to the predetermined order, other routes connecting the central controller to the other nodes are not blocked, wherein forwarding tables of the other nodes have not be populated with the predetermined routing paths.

15. The central controller as claimed in claim 14, wherein the step of flushing the firewall of each of the nodes comprises:

flushing the firewall of each of the nodes sequentially from a nearest node to a farthest node according to the predetermined routing paths.

16. The central controller as claimed in claim 14, wherein the processor further executes the plurality of instructions to:

determine whether a new spanning tree topology is converged in the network after disabling the spanning tree protocol function of one of the nodes.

17. The central controller as claimed in claim 16, wherein the step of determining whether the new spanning tree topology is converged in the network comprises:

determining whether a plurality of remaining nodes running the spanning tree protocol in the network point to a same spanning tree protocol root; and if the plurality of remaining nodes running the spanning tree protocol point to the same spanning tree protocol root, identifying the new spanning tree topology is converged in the network.

18. The central controller as claimed in claim 16, wherein the step of determining whether the new spanning tree topology is converged in the network comprises:

pinging the plurality of remaining nodes running the spanning tree protocol in the network once per an interval time; and if the plurality of remaining nodes running tire spanning tree protocol reply successfully and continuously for a predetermined number, identifying the new spanning tree topology is converged in the network.

19. The central controller as claimed in claim 14, wherein before enabling the firewall of each of the nodes to block the second routes, disabling the spanning tree protocol function of each of the nodes and populating the forwarding table of each of the nodes with the predetermined routing paths, the processor further executes the plurality of instructions to:

change a media access control (MAC) address of the central controller to a temporary MAC address.

20. The central controller as claimed in claim 14, wherein the steps of enabling the firewall of each of the nodes to block the second routes, disabling the spanning tree protocol function of each of the nodes and populating the forwarding table of each of the nodes with the predetermined routing paths comprise:

enabling firewall of each of nodes belonging to a spanning tree protocol leaf node among the nodes in parallel; disabling spanning tree protocol functions of the nodes belonging to the spanning tree protocol leaf node in parallel and populating forwarding tables of the nodes belonging to the spanning tree protocol leaf node in parallel.

21. The central controller as claimed in claim 14, wherein before enabling the firewall of each of the nodes to block the second routes, disabling the spanning tree protocol function of each of the nodes and populating the forwarding table of each of the nodes with the predetermined routing paths, the processor further executes the plurality of instructions to:

set a node directly connected to the central controller among the nodes as a spanning tree protocol root.

22. The central controller as claimed in claim 14, wherein if the plurality of third routes are the same as the plurality of first routes and the second routes, the step of populating the forwarding table of each of the nodes with the predetermined routing paths is performed before the step of enabling the firewall of each of the nodes to block the second routes or between the step of enabling the firewall of each of the nodes to block the second routes and the step of disabling the spanning tree protocol function of each of the nodes.

23. The central controller as claimed in claim 14, wherein the processor further executes the plurality of instructions to:

detect a new node in the network by periodically reading a link layer discovery protocol table or triggering a link up event;

populate the forwarding table of each of the nodes with a plurality of new routing paths;

send a gratuitous address resolution protocol packet to the new node;

disable a spanning tree protocol function of the new node; and populate a forwarding table of the new node with the plurality of new routing paths.

24. The central controller as claimed in claim 14, wherein the processor further executes the plurality of instructions to:

obtain a plurality of new routing paths, wherein an old node among the nodes is removed in the plurality of new routing paths; and populate the forwarding table of each of the nodes with the plurality of new routing paths.

25. A data center network system, comprising:
a central controller;
a plurality of switches;
a plurality of servers; and
a network, wherein a plurality of first routes connecting the central controller to the switches and the servers are established in the network through a spanning tree protocol and a plurality of second routes between the switches and the servers in the network through the spanning tree protocol, wherein the central controller gives commands to the switches and the servers to enable a firewall of each of the switches and the servers to block the second routes, give commands to the switches and the servers to disable a spanning tree protocol function of each of the switches and the servers after the firewall is enabled, give commands to the switches and the servers to populate a forwarding table of each of the switches and the servers with a plurality of predetermined routing paths after the spanning tree protocol function is disabled, and give commands to the switches and the servers to flush the firewall of each of the switches and the servers after the forwarding table is populated, wherein a plurality of third routes between the central controller, the switches and the servers are established according to the predetermined routing paths without the spanning tree protocol, after the firewall of each of the switches and the servers is flushed,
wherein the steps of enabling the firewall of each of the nodes to block the second routes, disabling the spanning tree protocol function of each of the nodes and populating the forwarding table of each of the nodes with the predetermined routing paths comprise:
according to a predetermined order, giving commands to a first node among the nodes to enable a first firewall of the first node to block at least one of the second routes, disable a spanning tree protocol function of the first node and populating a forwarding table of the first node with the predetermined routing paths; and after the forwarding table of the first node is populated with the predetermined routing paths, according to the predetermined order, giving commands to a second node among the nodes to enable a second firewall of the second node to block at least one of the second routes, disable a spanning tree protocol function of the second node and populate a forwarding table of the second node with the predetermined routing paths,
wherein when enabling the firewall of any one of the nodes according to the predetermined order, other routes connecting the central controller to the other nodes are not blocked, wherein forwarding tables of the other nodes have not be populated with the predetermined routing paths.

* * * * *